US012510209B2

(12) United States Patent
Varrassi et al.

(10) Patent No.: US 12,510,209 B2
(45) Date of Patent: Dec. 30, 2025

(54) CRYOGENIC UNIT

(71) Applicant: L'Air Liquide, Societe Anonyme pour l'Etude et l'Exploitation des Procedes Georges Claude, Paris (FR)

(72) Inventors: Lucien Varrassi, Argancy (FR); Etienne Gibaux, Argancy (FR); Vincent Hembert, Argancy (FR); Jean-Pierre Bernard, Houston, TX (US); Fabrice Vellandi, Argancy (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 233 days.

(21) Appl. No.: 18/378,505

(22) Filed: Oct. 10, 2023

(65) Prior Publication Data
US 2024/0125429 A1 Apr. 18, 2024

(30) Foreign Application Priority Data
Oct. 13, 2022 (FR) .................... FR 2210537

(51) Int. Cl.
*F17C 3/00* (2006.01)
(52) U.S. Cl.
CPC ......... *F17C 3/00* (2013.01); *F17C 2205/0111* (2013.01); *F17C 2205/0352* (2013.01); *F17C 2221/012* (2013.01); *F17C 2221/017* (2013.01); *F17C 2223/0161* (2013.01); *F17C 2270/0171* (2013.01)
(58) Field of Classification Search
CPC .. F17C 3/00; F17C 13/00; F17C 13/08; F17C 13/001; F17C 9/00; F17C 2205/0111; F17C 2205/0352; F17C 2221/12; F17C 2221/17; F17C 2223/0161; F17C 2270/0171; B60P 3/22
USPC .......................................... 62/50.7
See application file for complete search history.

(56) References Cited

U.S. PATENT DOCUMENTS

| 5,869,746 A | * | 2/1999 | Watanabe ............ B60K 15/013 62/50.7 |
| 5,954,101 A | | 9/1999 | Drube et al. |
| 2018/0266629 A1 | | 9/2018 | Murray et al. |
| 2019/0316734 A1 | * | 10/2019 | Raj .......................... F17C 7/02 |
| 2021/0222833 A1 | | 7/2021 | Hill |

FOREIGN PATENT DOCUMENTS

| CN | 110513595 A | * | 11/2019 | .............. F17C 13/00 |
| FR | 2 896 302 | | 7/2007 | |
| WO | WO-2020169191 A1 | * | 8/2020 | ............ F16L 23/032 |
| WO | WO 2022/099336 | | 5/2022 | |

OTHER PUBLICATIONS

French Search Report for FR 2 210 537, mailed Mar. 31, 2023.

* cited by examiner

*Primary Examiner* — William C Doerrler
(74) *Attorney, Agent, or Firm* — Justin K. Murray

(57) ABSTRACT

The invention relates to a cryogenic unit comprising: a cryogenic tank; a receptacle; a pipe comprising: a first end connected to the cryogenic tank; a second end; a first longitudinal portion; a second longitudinal portion; a bend between the first portion and the second portion; a connecting flange situated between the bend and the second end, wherein the cryogenic unit further includes: an item of fluidic equipment comprising an inlet end; and an outlet end and configured to be mounted removably inside the receptacle.

10 Claims, 3 Drawing Sheets

[Fig. 1]
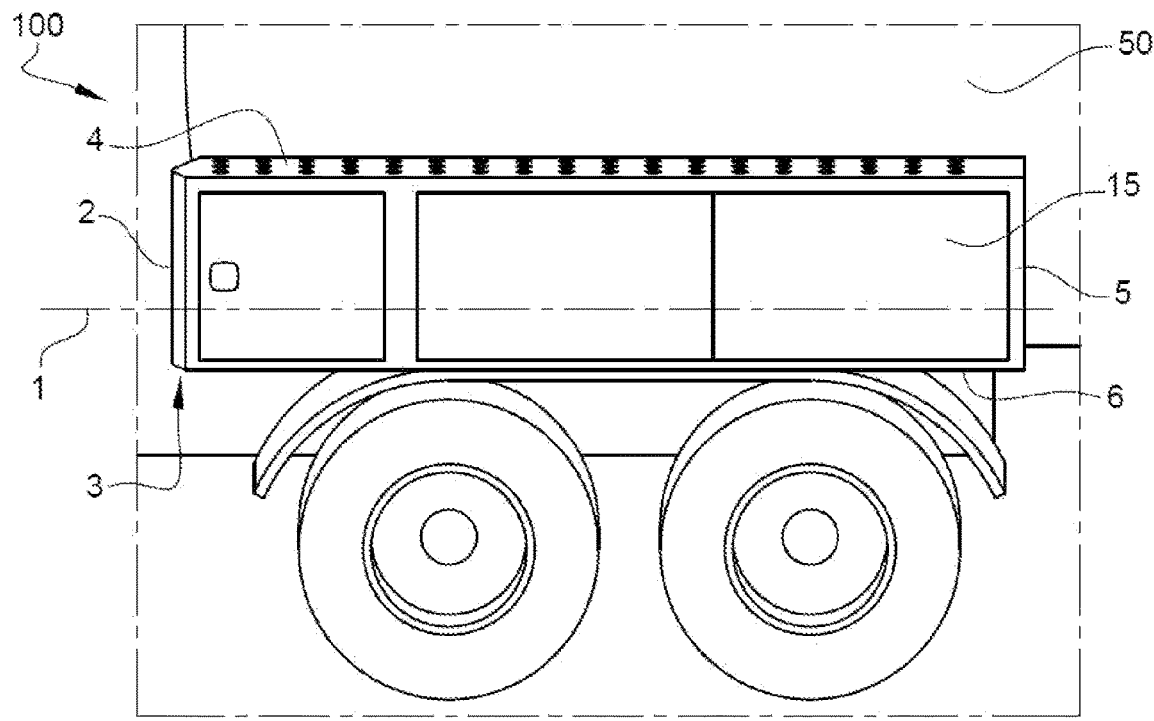
[Fig. 2]
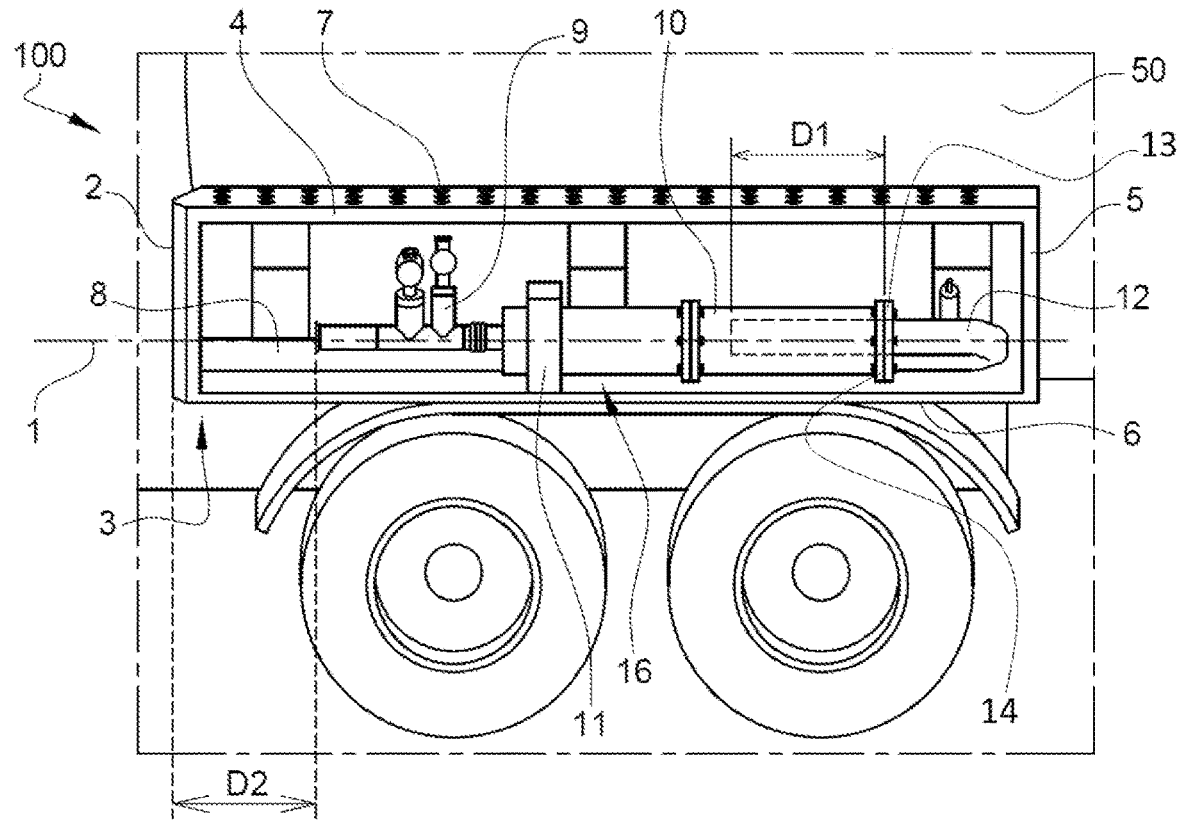

[Fig. 3]
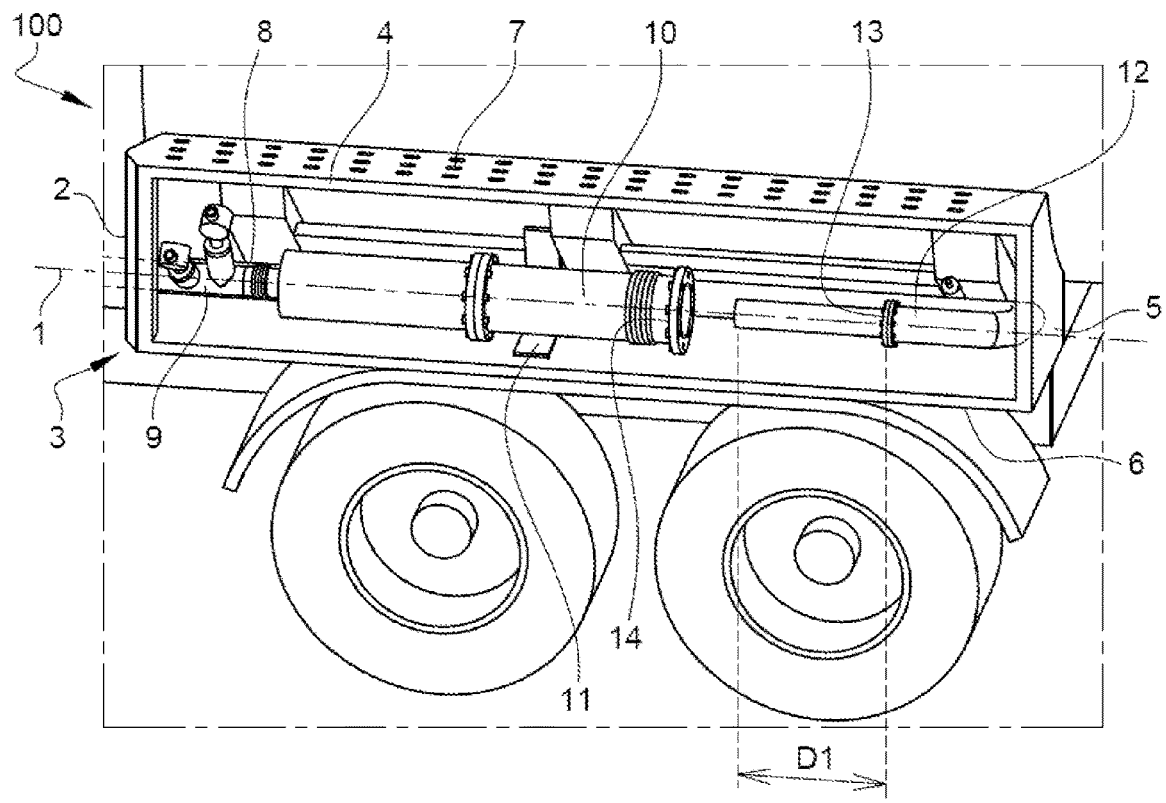

[Fig. 4]
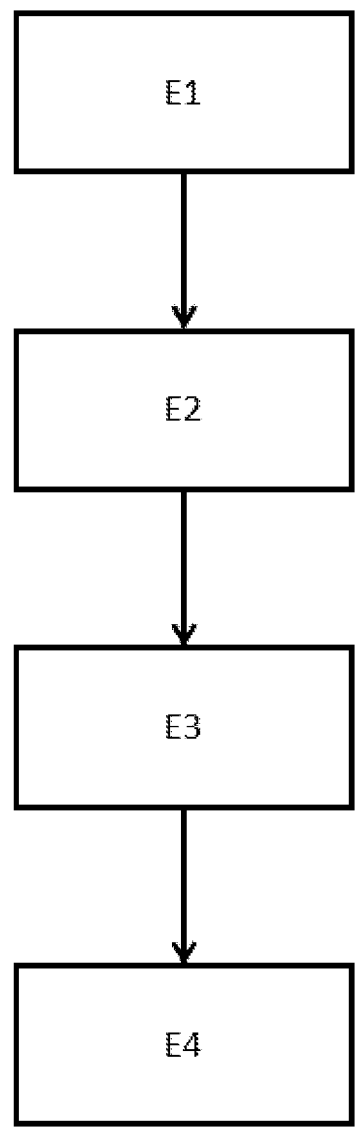

CRYOGENIC UNIT

CROSS REFERENCE TO RELATED APPLICATIONS

This application claims the benefit of priority under 35 U.S.C. § 119 (a) and (b) to French patent application No. FR2210537, filed Oct. 13, 2022, which is herein incorporated by reference in its entirety.

FIELD OF THE INVENTION

The present invention relates to a cryogenic unit and to a method for handling such a cryogenic unit.

BACKGROUND OF THE INVENTION

Various types of cryogenic unit comprising a cryogenic reservoir, a vacuum pipe and a receptacle to at least partially house the pipe, are known. Such a cryogenic unit is, for example, a cryogenic semitrailer or a cryogenic road tanker.

Such a receptacle may additionally house fluidic equipment through which cryogenic fluid leaving the tank passes.

One known problem is that the space available inside the receptacle is such that it is then impossible to dismantle the fluidic equipment. This is particularly problematical when there is a need to replace the fluidic equipment with other equipment, notably when there is a need to add a function to or replace a function of the fluidic equipment.

SUMMARY OF THE INVENTION

The present invention seeks to effectively overcome these disadvantages by proposing a cryogenic unit comprising: a cryogenic tank; a receptacle extending along a longitudinal axis between a first longitudinal side and a second longitudinal side, the receptacle being situated on the outside of the cryogenic tank; a pipe comprising: a first end connected to the cryogenic tank so that a cryogenic fluid contained in the cryogenic tank can circulate in the pipe; a second end situated inside the receptacle; a first longitudinal portion situated inside the receptacle and configured to allow the cryogenic fluid to circulate in a first direction travelling from the first end toward the second end; a second longitudinal portion situated inside the receptacle; a bend situated inside the receptacle between the first portion and the second portion; a connecting flange secured to the pipe and situated between the bend and the second end, the connecting flange being situated at a first distance from the second end. The cryogenic unit further may include: an item of fluidic equipment comprising an inlet end and an outlet end and configured to be mounted removably inside the receptacle in a mounted position; the second end being at least partially inserted into the fluidic equipment via the inlet end; the fluidic equipment being connected to the connecting flange so as to allow the cryogenic fluid to enter the fluidic equipment via the inlet end.

This allows the item of fluidic equipment to be fitted and removed relative to the receptacle.

According to one embodiment, when the fluidic equipment is in the mounted position, a second distance separates the outlet end of the fluidic equipment from a plane orthogonal to the longitudinal axis and adjacent to the first longitudinal side, the second distance being greater than the first distance.

This allows the fluidic equipment to be removed by sliding it longitudinally along the longitudinal axis once it is no longer connected to the connecting flange.

According to one embodiment, the receptacle is mounted secured to the cryogenic tank.

According to one embodiment, the pipe is mounted free relative to the receptacle.

According to one embodiment, the first longitudinal portion extends in a direction parallel to the direction in which the second longitudinal portion extends.

This allows the fluid to circulate in a first direction when it circulates in the first longitudinal portion and in a second direction, opposite to the first direction, when it circulates in the second portion.

According to one embodiment, the bend is U-shaped.

According to one embodiment, the first longitudinal portion extends along the longitudinal axis.

According to one embodiment, the second longitudinal portion extends along the longitudinal axis.

According to one embodiment, the fluidic equipment comprises a pump and/or a flow meter.

According to one embodiment, the inlet end comprises a mechanical-coupling device for mechanically coupling with the connecting flange.

According to one embodiment, a seal is interposed between the mechanical-coupling device and the connecting flange.

According to one embodiment, the second end forms a free end of the second portion.

According to one embodiment, the pipe comprises a tube, notably a rigid tube.

According to one embodiment, the first end of the pipe is connected, notably fluidically connected, to the cryogenic tank by welding.

According to one embodiment, the pipe is fixed to the cryogenic tank, notably by at least one fixing support attached to the external wall of the cryogenic tank.

According to one embodiment, the cryogenic unit comprises a control cabinet mounted secured to the cryogenic tank.

According to one embodiment, the first longitudinal side is adjacent to one face of the cabinet.

According to one embodiment, the first longitudinal side has an opening onto the face of the cabinet.

According to one embodiment, when the item of fluidic equipment is in the mounted position, the outlet end is closer to the first longitudinal side than to the second longitudinal side.

According to one embodiment, the length of the first longitudinal portion is greater than the length of the item of fluidic equipment, measured between the inlet and outlet ends thereof.

According to one embodiment, the bend is configured to allow the fluid to flow in the second portion in a second direction opposite to the first direction.

According to one embodiment, the pipe enters the receptacle via the first longitudinal side.

According to one embodiment, the cryogenic unit comprises a cryogenic-fluid distribution hose, such as a flexible hose, situated at least partially inside the receptacle and connected removably to the outlet end of the fluidic equipment.

Such a cryogenic unit allows the cryogenic-fluid distribution hose to be positioned suitably relative to the cryogenic tank thereby making it easier to dispense the cryogenic fluid and/or making it possible to limit the length of the distribution hose.

According to one embodiment, the pipe is of the vacuum thermally insulated type.

According to one embodiment, the second distance is less than 2 times the first distance, notably less than 1.5 times the first distance and in particular less than 1.2 times the first distance.

According to one embodiment, the receptacle comprises an upper wall, notably equipped with a first plurality of orifices to ventilate the receptacle.

According to one embodiment, the upper wall comprises a plurality of louvres, notably progressive louvres, to make it possible to prevent the ingress of a liquid into the receptacle under the effect of gravity, while at the same time allowing the escape of a gas located inside the receptacle in the event of a leak.

According to one embodiment, the louvres are obtained by pressing.

According to one embodiment, the receptacle has a lower wall equipped with a collecting pan for collecting condensate and/or liquefied air.

According to one embodiment, the receptacle comprises a front face extending along a plane parallel to the longitudinal axis and having at least one removable portion or one removable wall to allow access to the inside of the receptacle.

According to one embodiment, the receptacle comprises a lateral wall at the first longitudinal side and/or the second longitudinal side, the lateral wall notably comprising a non-rectilinear edge conforming to the shape of the external wall of the cryogenic tank.

According to one embodiment, the cryogenic unit comprises a clamping collar fixed to the receptacle and configured to be placed in a first configuration in which it at least partially encircles the fluidic equipment and provides guidance for the fluidic equipment so as to allow it to slide in the direction of the longitudinal axis.

According to one embodiment, the clamping collar is fixed to the receptacle by welding or is screwed to the receptacle.

According to one embodiment, the clamping collar is configured to be placed in a second configuration in which the fluidic equipment is free with respect to the receptacle, at least in a direction transverse to the longitudinal axis.

According to one embodiment, the cryogenic fluid contains liquid hydrogen or liquid helium.

In certain embodiments, the invention also relates to a method for handling a cryogenic unit as described hereinabove, comprising the steps of: detaching the fluidic equipment from the connecting flange; moving the fluidic equipment by sliding it along the longitudinal axis towards the first longitudinal side until the second end is situated outside the fluidic equipment; and extracting the fluidic equipment from inside the receptacle.

According to one embodiment, the method comprises a step of inerting the pipe prior to the step of detaching the fluidic equipment from the connecting flange.

According to one embodiment, the receptacle is positioned to the rear of the cryogenic tank.

The invention also relates to a vehicle such as a truck or a trailer or a semitrailer or a road tanker comprising a cryogenic unit as described hereinabove.

According to one embodiment, the vehicle comprises a control cabinet.

According to one embodiment, the vehicle comprises a rear axle.

According to one embodiment, the receptacle is positioned beneath the control cabinet or in the control cabinet.

As an alternative, the receptacle is positioned at the level of the rear axle, notably above a mudguard.

According to one embodiment, the receptacle is positioned at the rear of the vehicle.

According to one embodiment, the vehicle extends along the longitudinal axis.

The invention finally relates to the use of a cryogenic unit as described hereinabove on a truck or a trailer or a semitrailer or a road tanker.

BRIEF DESCRIPTION OF THE DRAWINGS

Other features and advantages of the invention will become further apparent via, on the one hand, the following description and, on the other hand, several exemplary embodiments given by way of non-limiting indication and with reference to the attached schematic drawings, in which:

FIG. 1 is a schematic depiction of a cryogenic unit according to the invention;

FIG. 2 is a schematic depiction of the cryogenic unit of FIG. 1, with an item of fluidic equipment mounted in a receptacle;

FIG. 3 is a schematic depiction of the cryogenic unit of FIG. 2, with the fluidic equipment in the process of being removed relative to the receptacle; and FIG. 4 is a schematic depiction of the method according to the invention.

DETAILED DESCRIPTION OF THE INVENTION

Those elements which are identical, similar or analogous keep the same reference from one figure to the next.

As illustrated in FIG. 1, what has been depicted is a cryogenic unit 100 comprising:
- a cryogenic tank 50;
- a receptacle 3 extending along a longitudinal axis 1 between a first longitudinal side 2 and a second longitudinal side 5, the receptacle 3 being situated on the outside of the cryogenic tank 50.

The receptacle 3 may include: an upper wall 4 equipped with a first plurality of orifices 7 to ventilate the receptacle 3, a lower wall equipped with a collecting pan 6 for collecting condensate and/or liquefied air, a front face extending along a plane parallel to the longitudinal axis 1 and having at least one removable portion 15 or one removable wall 15 to allow access to the inside of the receptacle 3.

According to one embodiment, the front face comprises a second plurality of orifices to ventilate the receptacle 3.

The receptacle 3 comprises a lateral wall at the first longitudinal side 2 and/or the second longitudinal side, the lateral wall notably comprising a non-rectilinear edge conforming to the shape of the external wall of the cryogenic tank 50.

According to one embodiment, the lateral wall comprises a third plurality of orifices to ventilate the receptacle 3.

FIG. 2 depicts the cryogenic unit 100 of FIG. 1 with the removable wall 15 having been removed to allow access to the inside of the receptacle 3.

As depicted in FIG. 2, the cryogenic unit 100 comprises a pipe 8.

The pipe 8 may include: a first end connected to the cryogenic tank 50 so that a cryogenic fluid contained in the cryogenic tank 50 can circulate in the pipe 8; a second end situated inside the receptacle 3; a first longitudinal portion situated inside the receptacle 3 and configured to allow the cryogenic fluid to circulate in a first direction travelling from the first end toward the second end; a second longitudinal portion situated inside the receptacle 3; a bend 12 situated inside the receptacle 3 between the first portion and the second portion; and a connecting flange 13 secured to the pipe 8 and situated between the bend 12 and the second end, the connecting flange 13 being situated at a first distance D1 from the second end.

The cryogenic unit 100 comprises an item of fluidic equipment 16 comprising an inlet end and an outlet end and configured to be mounted removably inside the receptacle 3.

FIG. 2 depicts the fluidic equipment 16 when it is in the mounted position.

When the fluidic equipment 16 is in the mounted position: the second end is at least partially inserted into the fluidic equipment 16 via the inlet end; the fluidic equipment 16 is connected to the connecting flange 13 so as to allow the cryogenic fluid to enter the fluidic equipment 16 via the inlet end.

The fluidic equipment 16 comprises a mechanical-coupling device 14 for mechanically coupling to the connecting flange 13. More specifically, the mechanical-coupling device 14 is to situated at the inlet end and comprises for example a mating flange that complements the connecting flange 13.

The fluidic equipment 16 comprises a pump 9 and a flow meter 10.

The cryogenic unit 100 comprises a clamping collar 11 fixed to the receptacle 3. The clamping collar 11 is configured to be placed in a first configuration in which it at least partially encircles the fluidic equipment 16 and provides guidance for the fluidic equipment 16 so as to allow it to slide in the direction of the longitudinal axis 1.

The bend 12 is configured to allow the fluid to flow in the second portion in a second direction opposite to the first direction.

The pipe 8 enters the receptacle 3 via the first longitudinal side 2.

The cryogenic unit 100 comprises a cryogenic-fluid distribution hose (not depicted), such as a flexible hose, situated at least partially inside the receptacle 3 and connected removably to the outlet end of the fluidic equipment 16.

The pipe 8 is a vacuum thermally insulated pipe. The pipe 8 is connected to the cryogenic tank 50 by a weld, the pipe 8 and the cryogenic tank 50 being in fluidic communication, notably via an opening.

When the fluidic equipment 16 is in the mounted position, a second distance D2 separates the outlet end of the fluidic equipment from a plane orthogonal to the longitudinal axis 1 and adjacent to the first longitudinal side 2.

The second distance D2 is greater than the first distance D1.

This makes it possible to leave an empty space between the outlet end and the first longitudinal side 2, this space allowing the fluidic equipment to be brought clear as it slides along the longitudinal axis 1 until the second end exits the fluidic equipment 16.

When the item of fluidic equipment 16 is in the mounted position, the outlet end is closer to the first longitudinal side 2 than to the second longitudinal side 5.

The length of the first longitudinal portion is strictly greater than the length of the fluidic equipment 16, the length of the fluidic equipment 16 being measured between the inlet and outlet ends thereof.

The clamping collar 11 is configured to be placed in a second configuration in which the fluidic equipment 16 is free with respect to the receptacle 3, at least in a direction transverse to the longitudinal axis 1.

FIG. 3 depicts, in elevation, the cryogenic unit 100 when the fluidic equipment 16 is in the process of being removed relative to the receptacle 3.

As depicted in FIG. 3: the fluidic equipment 16 has slid in the direction of the longitudinal axis 1 over a length greater than the first distance D1, which is to say as far as a position in which the second end is out of the fluidic equipment 16; the clamping collar 11 is in the second configuration.

When the clamping collar 11 is in the second configuration, a detachable portion of the clamping collar 11 has been detached so as to allow the fluidic equipment 16 to pivot relative to the longitudinal axis 1.

The receptacle 3 may be mounted on a vehicle such as a truck or a trailer or a semitrailer or a road tanker for transporting the cryogenic tank 50.

Specifically, such a cryogenic unit 100 is particularly well suited to a use in which the cryogenic tank 50 is mobile, which notably involves stresses that are more severe than in the event that the cryogenic tank is stationary.

The vehicle may have a rear axle. The receptacle 3 may be mounted at the rear axle, for example above a mudguard.

The pipe 8 enters the receptacle 3 via the first longitudinal side 2 and the cryogenic-fluid distribution hose exits the receptacle 3 via the first longitudinal side 2. The first longitudinal side 2 is positioned at the rear side of the trailer or of the semitrailer. Such an arrangement makes it easier to distribute the cryogenic fluid at the rear of the trailer or of the semitrailer while at the same time reducing the length of the distribution hose.

FIG. 4 depicts the steps of a method for handling a cryogenic unit 100 as described hereinabove.

The handling method involves the steps of:
  detaching E2 the fluidic equipment 16 from the connecting flange 13;
  moving E3 the fluidic equipment 16 by sliding it along the longitudinal axis 1 towards the first longitudinal side 2 until the second end is situated outside the fluidic equipment 16,
  extracting E4 the fluidic equipment 16 from inside the receptacle 3.

According to one embodiment, the method comprises a step E1 of inerting the pipe 8 prior to the step E2 of detaching the fluidic equipment from the connecting flange.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the ap-pended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising").

"Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

What is claimed is:

1. A cryogenic unit comprising:
   a cryogenic tank;
   a receptacle extending along a longitudinal axis between a first longitudinal side and a second longitudinal side, the receptacle being situated on the outside of the cryogenic tank;
   a pipe comprising:
      a first end connected to the cryogenic tank so that a cryogenic fluid contained in the cryogenic tank can flow in the pipe;
      a second end situated inside the receptacle;
      a first longitudinal portion situated inside the receptacle and configured to allow the cryogenic fluid to circulate in a first direction travelling from the first end toward the second end;
      a second longitudinal portion situated inside the receptacle;
      a bend situated inside the receptacle between the first portion and the second portion; and
      a connecting flange secured to the pipe and situated between the bend and the second end, the connecting flange being situated at a first distance from the second end;
   an item of fluidic equipment comprising an inlet end and an outlet end and configured to be mounted removably inside the receptacle in a mounted position;
   the second end being at least partially inserted into the fluidic equipment via the inlet end; and
   the fluidic equipment being connected to the connecting flange so as to allow the cryogenic fluid to enter the fluidic equipment via the inlet end.

2. The cryogenic unit according to claim 1, wherein, when the fluidic equipment is in the mounted position, a second distance separates the outlet end of the fluidic equipment from a plane orthogonal to the longitudinal axis and adjacent to the first longitudinal side, the second distance being greater than the first distance.

3. The cryogenic unit according to claim 1, wherein the length of the first longitudinal portion is greater than the length of the item of fluidic equipment, measured between the inlet and outlet ends thereof.

4. The cryogenic unit according to claim 1, wherein the bend is configured to allow the fluid to flow in the second portion in a second direction opposite to the first direction.

5. The cryogenic unit according to claim 1, wherein the pipe enters the receptacle via the first longitudinal side.

6. The cryogenic unit according to claim 1, comprising a cryogenic-fluid distribution hose, such as a flexible hose, situated at least partially inside the receptacle and connected removably to the outlet end of the fluidic equipment.

7. The cryogenic unit according to claim 1, wherein the receptacle has a lower wall equipped with a collecting pan for collecting condensate and/or liquefied air.

8. The cryogenic unit according to claim 1, comprising a clamping collar fixed to the receptacle and configured to be placed in a first configuration in which it at least partially encircles the fluidic equipment and provides guidance for the fluidic equipment so as to allow it to slide in the direction of the longitudinal axis.

9. The cryogenic unit according to claim 8, the clamping collar being configured to be placed in a second configuration in which the fluidic equipment is free with respect to the receptacle, at least in a direction transverse to the longitudinal axis.

10. A method for handling a cryogenic unit, the method comprising the steps of:
    providing the cryogenic unit, of claim 1;
    detaching the fluidic equipment from the connecting flange;
    moving the fluidic equipment by sliding the fluidic equipment along the longitudinal axis towards the first longitudinal side until the second end is situated outside the fluidic equipment; and
    extracting the fluidic equipment from inside the receptacle.

* * * * *